(12) United States Patent
Tahir et al.

(10) Patent No.: US 7,669,858 B2
(45) Date of Patent: Mar. 2, 2010

(54) MECHANICAL SEAL SUPPORT SYSTEMS

(75) Inventors: Nadim Tahir, Rotherham (GB); James Francis McKeever, Belfast (GB)

(73) Assignee: AES Engineering Ltd., Rotherham (GB)

( * ) Notice: Subject to any disclaimer, the term of this patent is extended or adjusted under 35 U.S.C. 154(b) by 0 days.

(21) Appl. No.: 11/702,284

(22) Filed: Feb. 5, 2007

(65) Prior Publication Data

US 2007/0132188 A1    Jun. 14, 2007

Related U.S. Application Data

(63) Continuation of application No. 11/055,321, filed on Feb. 10, 2005, now abandoned.

(30) Foreign Application Priority Data

Feb. 10, 2004    (GB) .................................. 0402887.4

(51) Int. Cl.
*F16J 15/34* (2006.01)
(52) U.S. Cl. ...................... 277/318; 277/408
(58) Field of Classification Search ................. 277/318, 277/408
See application file for complete search history.

(56) References Cited

U.S. PATENT DOCUMENTS

| | | | | |
|---|---|---|---|---|
| 2,834,619 A | * | 5/1958 | McNab | 277/317 |
| 3,297,329 A | * | 1/1967 | Smith et al. | 277/318 |
| 3,498,620 A | | 3/1970 | Wiese | |
| 3,526,408 A | * | 9/1970 | Tracy | 277/379 |
| 3,937,022 A | * | 2/1976 | Swearingen | 60/657 |
| 4,691,276 A | * | 9/1987 | Miller et al. | 700/47 |
| 4,858,937 A | * | 8/1989 | Fairlie-Clarke et al. | 277/320 |
| 5,249,812 A | | 10/1993 | Volden et al. | |
| 5,412,977 A | * | 5/1995 | Schmohl et al. | 73/46 |
| 5,498,007 A | * | 3/1996 | Kulkarni et al. | 277/400 |
| 5,762,342 A | * | 6/1998 | Kakabaker et al. | 277/306 |
| 5,769,427 A | | 6/1998 | Ostrowski | |
| 5,865,441 A | | 2/1999 | Orlowski | |
| 6,070,880 A | | 6/2000 | McKeever | |
| 6,116,609 A | | 9/2000 | Azibert | |
| 7,497,229 B2 | * | 3/2009 | Tahir et al. | 137/391 |
| 2001/0017445 A1 | * | 8/2001 | Hall et al. | 277/457 |
| 2002/0109302 A1 | * | 8/2002 | Muraki | 277/408 |

FOREIGN PATENT DOCUMENTS

CA    2419189    8/2004

OTHER PUBLICATIONS

Search Report for British Patent Application No. GB0502754.5, dated May 18, 2005.

* cited by examiner

*Primary Examiner*—Alison K Pickard
(74) *Attorney, Agent, or Firm*—Myers Bigel Sibley & Sajovec

(57) ABSTRACT

A mechanical seal support system may facilitate feeding barrier fluid to a mechanical seal. A predetermined difference in pressure between the barrier fluid at a position before and after passage through the seal is detected. The flow of barrier fluid to the seal may be reduced when the predetermined pressure difference is detected.

8 Claims, 1 Drawing Sheet

MECHANICAL SEAL SUPPORT SYSTEMS

RELATED APPLICATION

This application is a continuation of U.S. patent application Ser. No. 11/055,321, filed Feb. 10, 2005 now abandoned, which claims the benefit of and priority to Great Britain Patent Application No. GB0402887.4, filed Feb. 10, 2004, the disclosures of which are hereby incorporated herein by reference.

FIELD OF THE INVENTION

This invention relates to mechanical seal support systems and especially systems, which are used with mechanical seals for the containment of barrier fluid when forced circulation systems are used.

BACKGROUND TO THE INVENTION

A seal support system comprises of a vessel or tank, which generally contains a volume of fluid. The vessel is piped to a sealing device on a pump, mixer or item of rotating equipment. Generally a return pipe is lead back to the vessel from the sealing device, hence closing the "loop". This allows the fluid, contained in the vessel, to enter and exit the sealing device. Such fluid is generally chosen so that it lubricates and cools the components within the sealing device, whilst being compatible with the process fluid.

The industry term for the fluid contained within the vessel, is barrier or buffer fluid.

Mechanical seals generate a tremendous amount of heat due to friction as the seal faces rub against each other. In applications where small heat loads need to be removed, it is common to use a small vessel, which has a seal supply port and a seal return port built into it.

This vessel is usually placed higher than the mechanical seal, and is piped in such a way that the seal supply port is situated at the bottom of the vessel, and the seal return port further up the vessel. This ensures that when the vessel is full of fluid and is piped to the seal, the colder fluid is fed to the mechanical seal, and is warmed up by the seal.

This fluid then 'rises' back up into the vessel, and hence a 'thermal loop' is created. This effect is commonly termed the 'thermosyphon effect'. The fluid in the vessel then cools to the atmosphere and the level of cooling can be increased by factors such as surface area, the use of finned tubing, passing wind over the vessel etc.

However, in some applications the mechanical seal generates too much heat for a thermosyphon system to dissipate. This can be due to a number of factors such as: high heat transfer from the process fluid to the barrier fluid, large mechanical seal sizes, high speed, hard seal faces and high ambient temperatures.

In this case, a forced circulation system may be employed. This type of system ensures that barrier fluid is forced through the seal from a vessel using a pump and motor set and then back into the tank where the barrier fluid cools to the atmosphere.

The AESSEAL PUMPPAC™ is a system which performs this task, and has the ability to pressurise the barrier fluid being supplied to the mechanical seal, ensuing that if there is any leakage across the seal face, it is always the compatible and safe barrier fluid into the product, rather than the product (which may be hazardous to the environment) into the atmosphere/vessel.

It is recommended to set the pressure of the barrier fluid 1 bar above that of the process fluid for this specific reason.

As the mechanical seal wears, the seal begins to 'leak' more barrier fluid into the product, however the PUMPPAC™ system ensures that the pressure of the barrier fluid supplied to the mechanical seal remains constant.

However, should a mechanical seal eventually fail the PUMPPAC™ system continues supplying oil into the product, hence 'watering down' or contaminating the product, which may lead to a product being wasted.

The PUMPPAC™ system may also be used with a double seal, i.e. it can support both the in-board and out-board seal faces. If an in-board seal failure were to occur, this would lead to the same scenario as previously described.

The modular concept of the PUMPPAC™ system ensures that a level switch may be added to the vessel, which would warn an operator of too much loss of fluid. Should the operator need to know that the mechanical seal had failed instantly, the modular concept of the PUMPPAC™ system ensures that a pressure switch may be fitted, which would warn an operator of loss in pressure due to a major leak in the mechanical seal.

If an out-board seal failure were to occur, the standard PUMPPAC™ system would continue pumping the fluid through the seal, but due to the damaged out-board faces, this fluid would then be ejected into the atmosphere. This would continue to occur until the pump was either switched off, or until the vessel would be become empty.

Again, due to the modular concept of the PUMPPAC™ System, level and pressure switches can be added to ensure that operators are warned of any such event.

However, warning systems which require operator input are always subject to 'operator error', and in some cases the operator may not be present at the exact time the fault occurs. Hence, an automated safety system is deemed to be advantageous.

The effects of an out-board seal failure, could potentially be a much more dangerous scenario. If the barrier fluid is for example a fluid with a low ignition temperature (the ignition (sometimes called auto-ignition) temperature of a substance is the minimum temperature required to initiate or to cause self-sustained combustion independent of the heat source. A spark or flame is not necessary for ignition when a flammable vapour reaches its auto-ignition temperature), this type of fluid can cause a fire hazard if the fluid is leaked into the surrounding atmosphere due to an outboard seal failure. In this instance, if there is a delay in the operator shutting down the pump, a serious accident may occur, hence an automated system is even more advantageous.

One approach employed in order ensure that the high level of safety of the PUMPPAC™ System is not compromised is the use of a standard pressure switch, whereby the pressure is simply monitored at the return line from the seal to the PUMPPAC™ System. The switch may be set to be triggered on falling pressure, which can ultimately send a signal to a relay, which ultimately shuts down the motor on the PUMPPAC™, preventing excess barrier fluid loss.

In the present invention the use of an oil safety fuse system ensures that in the event of mechanical seal failure (single seal, double seal, in-board/out-board etc.) the flow of barrier fluid to the mechanical seal is shut off, hence preventing excess barrier fluid loss. This system does not use electrical components and this is particularly advantageous in hazardous areas. Upon the failure of any seal the barrier fluid is safely channeled back into the vessel, bypassing the mechanical seal, and hence preventing excess barrier fluid leakage.

SUMMARY

According to a first aspect of the invention there is provided a mechanical seal support system comprising;
  means for feeding barrier fluid to a mechanical seal;
  means for detecting a predetermined difference in pressure between barrier fluid at a position before and after passage through said seal;
  means, responsive to said detection means, for reducing the flow of barrier fluid to said seal when said predetermined pressure difference is detected.

The system stops supplying oil into the product, "watering down" the product or contaminating the product, which may lead to a product being wasted.

Preferably the fluid flow reducing means substantially eliminates the flow of barrier fluid to the seal. Preferably the mechanical seal is selected from the group consisting of; single seal, double seal, in-board or out-board seal of a double mechanical seal.

Even more preferably still the user can pre-determine the pressure differential of the barrier fluid across the mechanical seal which results in the fluid flow diverting valve directing the barrier fluid away from the mechanical seal.

Even more preferably both the means for detecting a predetermined difference in pressure and the means for reducing the flow of barrier fluid to said seal is the fluid flow diverting valve.

More preferably still the mechanical seal support is provided with an adjustable auto re-set device which can be adjusted to allow for manual re-set or fully automatic timed re-set.

In a preferred embodiment of the invention the mechanical seal support system is a forced circulation mechanical seal support system.

BRIEF DESCRIPTION OF THE DRAWINGS

The present invention is described, by way of example only, with reference to the accompanying drawing, in which.

DETAILED DESCRIPTION

Figure 1:
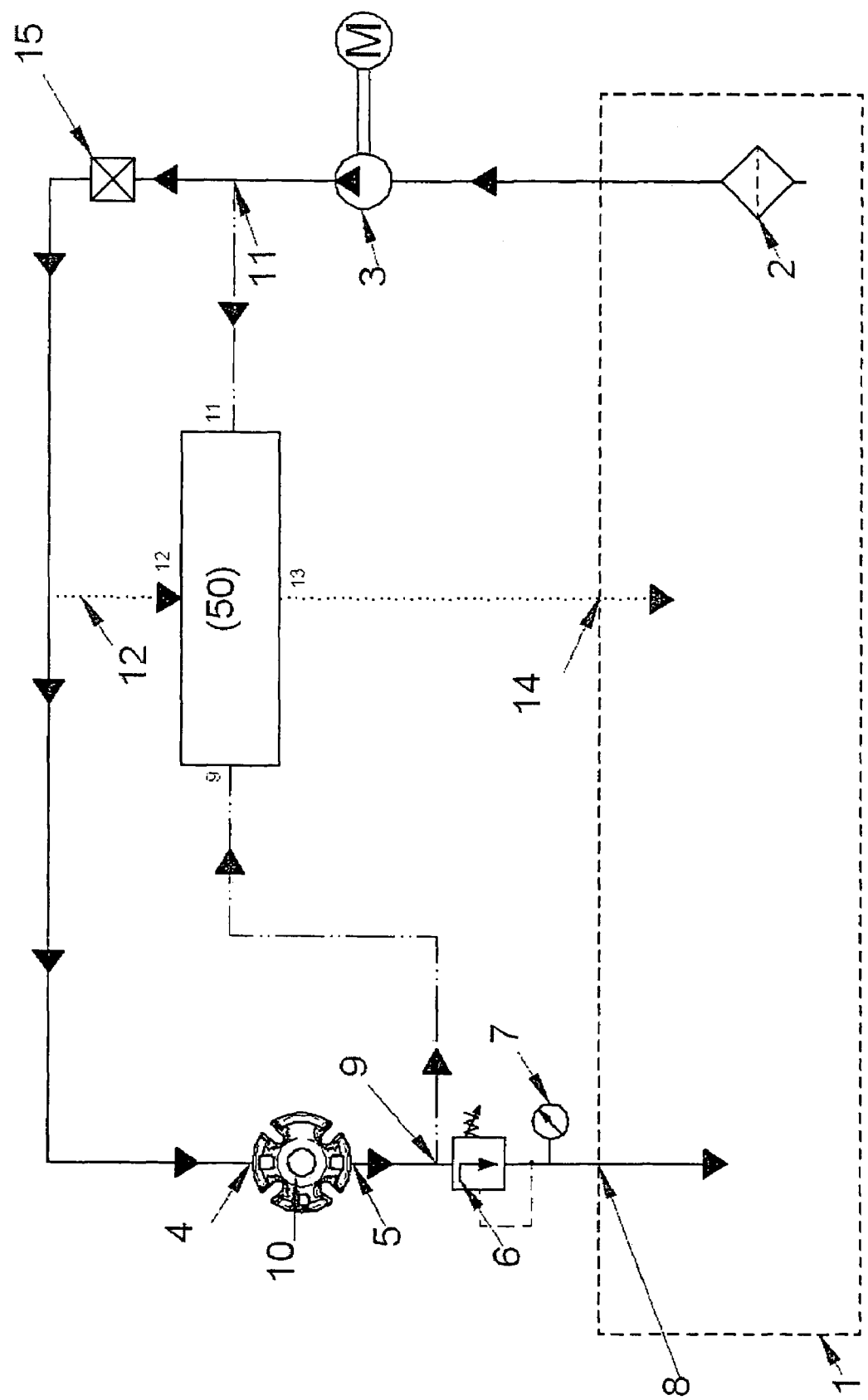
FIG. 1 illustrates, by way of example only, how the invention may be used in conjunction with an existing forced circulation barrier fluid support system.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

It will be understood that when an element or layer is referred to as being "on," "connected to," or "coupled to" another element or layer, it can be directly on, connected, or coupled to the other element or layer or intervening elements or layers may be present. In contrast, when an element is referred to as being "directly on," "directly connected to," or "directly coupled to" another element or layer, there are no intervening elements or layers present. As used herein, the term "and/or" includes any and all combinations of one or more of the associated listed items. Like numbers refer to like elements throughout the description.

Furthermore, relative terms, such as "lower" or "bottom" and "upper" or "top" may be used herein to describe one element's relationship to another element as illustrated in the figures. It will be understood that relative terms are intended to encompass different orientations of the device in addition to the orientation depicted in the figures. For example, if the device in the figures is turned over, elements described as being on the "lower" side of other elements would then be oriented on "upper" sides of the other elements. The exemplary term "lower" can, therefore, encompass both an orientation of "lower" and "upper," depending of the particular orientation of the FIGURE. Similarly, if the device in one of the figures is turned over, elements described as "below" or "beneath" other elements would then be oriented "above" the other elements. The exemplary terms "below" or "beneath" can, therefore, encompass both an orientation of above and below.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 shows a view of the oil safety fuse (50) when piped in conjunction with a forced circulation barrier fluid system.

The system consists of a reservoir which contains the barrier fluid (1). The barrier fluid is drawn through a suction filter (2) by a pump and motor set (3). This fluid is then pumped to the mechanical seal (10) at point 4. The fluid exits the mechanical seal (10) at point 5 and is forced through a regulating valve (6), the pressure of which can be read via the gauge (7). The hotter barrier fluid is then fed back into the reservoir (1) at point 8. The reservoir (1) then loses heat to the surrounding atmosphere, thereby cooling the bulk temperature of the liquid it contains.

The oil safety fuse (50) takes a pilot pressure reading (9) from the fluid exiting the mechanical seal (10). It also takes a pilot pressure reading from the fluid leaving the pump and motor set (3) at point (11). In addition, item 15 may also be employed in order to ensure that the pilot pressure at point 9 remains constant, regardless of a drop in pressure in the seal feed/return line. By way of example only, item 15 may be a needle valve or a pressure regulating valve which may be manually/automatically adjusted.

Should there be a pressure drop between the two pilot pressures, the flow of oil is diverted to point 12 into the oil safety fuse (50) and the flow to the mechanical seal (10) is blocked. The fluid then leaves the oil safety fuse from point 13 and back into the reservoir (1) at point 14.

A check valve (16) may also be added to the seal feed line in order to prevent the possibility of the sealed product contaminating the barrier support system.

Hence, the flow to the mechanical seal (10) is isolated, and loss of barrier fluid is totally minimised.

Occasionally, processes can suffer pressure upsets which can cause the mechanical seal (10) to leak more than in normal working conditions. In this instance, the oil safety fuse (50) would isolate the flow to the mechanical seal (10). However, if the pressure in the process then returned to the normal pressure, the automatic reset facility within the oil safety valve ensures that the flow of barrier fluid to the seal is restored.

Optionally, instrumentation may also be added to the concept to warn operators of mechanical seal failures, level losses and pressure losses.

In concluding the detailed description, it should be noted that many variations and modifications can be made to the embodiments without substantially departing from the principles of the present invention. All such variations and modifications are intended to be included herein within the scope of the present invention, as set forth in the following claims.

That which is claimed:

1. A mechanical seal support system comprising;
   means for feeding barrier fluid to a mechanical seal;
   means for detecting a difference in pressure between barrier fluid at a position before and after passage through said seal;
   a reservoir from which the barrier fluid is drawn; and
   a fluid flow diverting valve, positioned between the reservoir and said seal and responsive to said detection means, configured to substantially eliminate barrier fluid flow to said seal and to divert the circulation of the barrier fluid towards the reservoir when the difference in pressure between the barrier fluid at the position before passage through said seal and after passage through said seal is greater than a predetermined difference.

2. A mechanical seal support system according to claim 1, wherein the means for detecting a difference in pressure is the fluid flow diverting valve.

3. A mechanical seal support system according to claim 1, wherein the fluid flow diverting valve is provided with a re-set device which enables the valve to open when the pressure differential is reduced to a pre-determined level.

4. A mechanical seal support system according to claim 3, wherein the re-set device is automatic or manual.

5. A mechanical seal support system according to claim 3, wherein the re-set device is adjustable.

6. A mechanical seal support system according to claim 1, wherein the mechanical seal is a single seal, double seal, in-board, or out-board seal of a double mechanical seal.

7. A mechanical seal support system according to claim 6, wherein the system is a forced circulation mechanical seal support system.

8. A mechanical seal assembly, comprising:
   a mechanical seal;
   means for feeding barrier fluid to the mechanical seal;
   means for detecting a difference in pressure between barrier fluid at a position before and after passage through said seal;
   a reservoir from which the barrier fluid is drawn; and
   a fluid flow diverting valve, positioned between the reservoir and said seal and responsive to said detection means, configured to substantially eliminate barrier fluid flow to said seal and to divert the circulation of the barrier fluid towards the reservoir when the difference in pressure between the barrier fluid at the position before passage through said seal and after passage through said seal is greater than a predetermined difference.

* * * * *